INVENTOR:
JAMES W. SHERRILL

BY Parrott, Bell, Seltzer, Park & Heard
ATTORNEYS

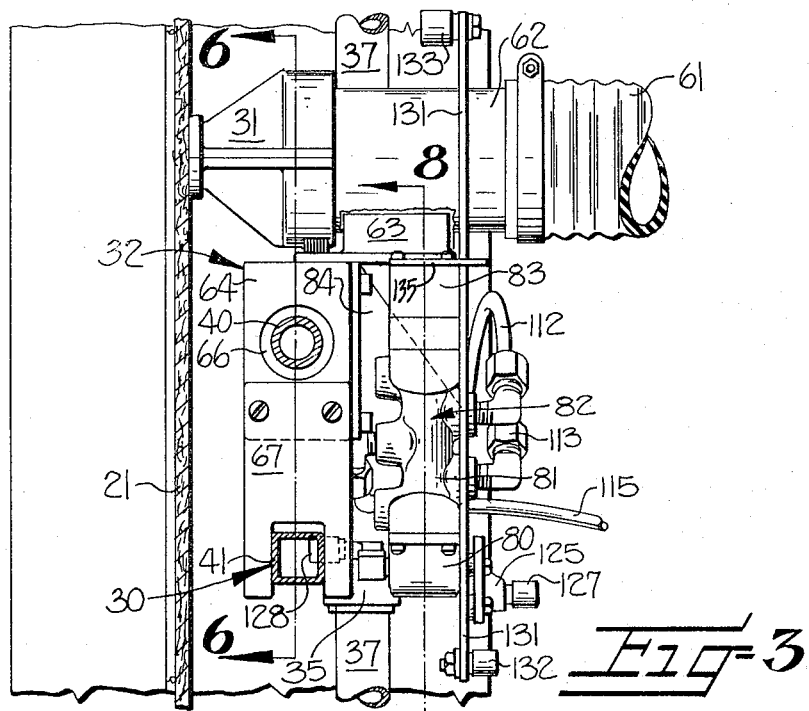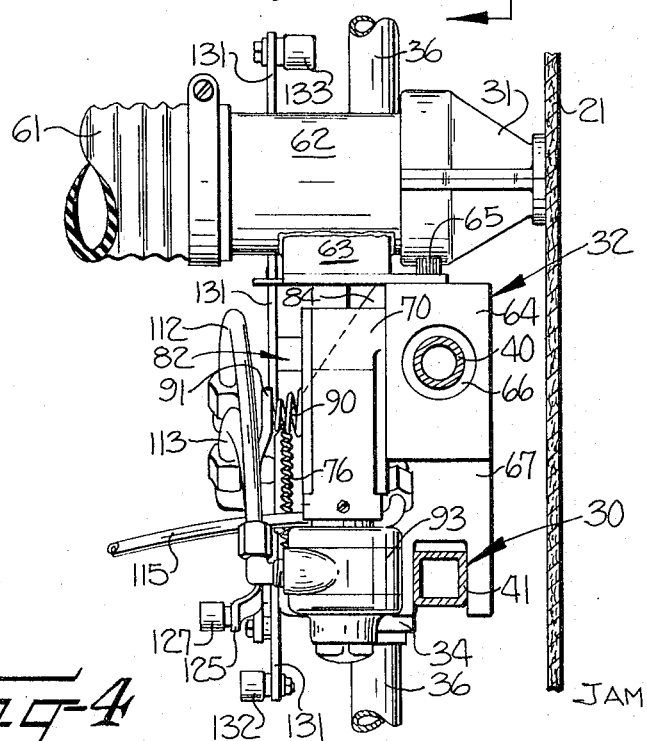

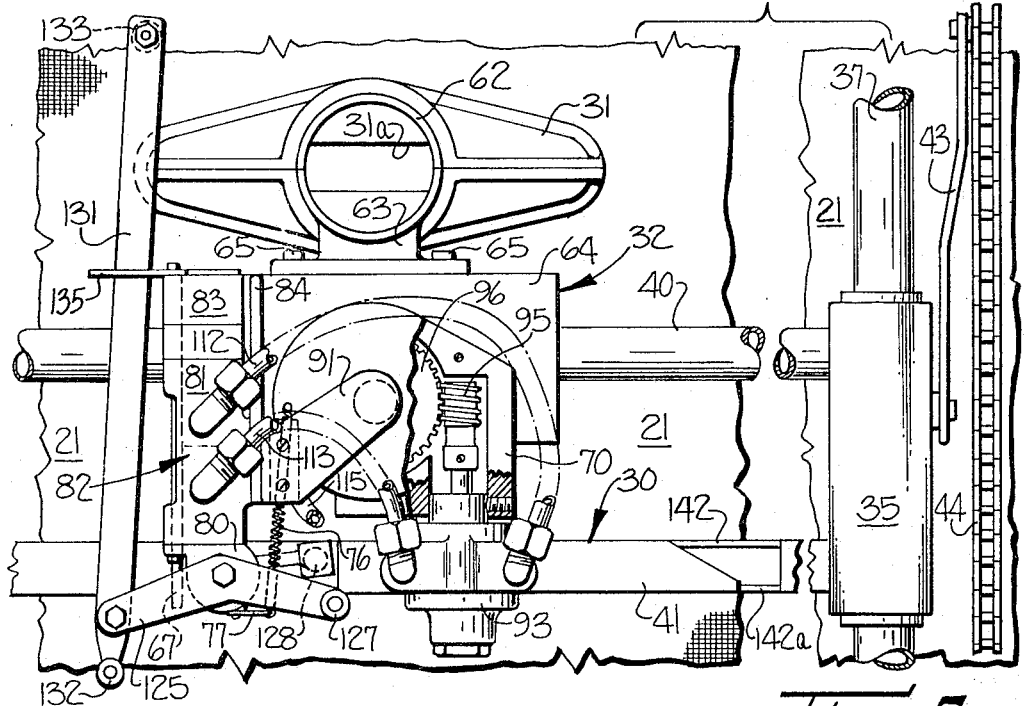
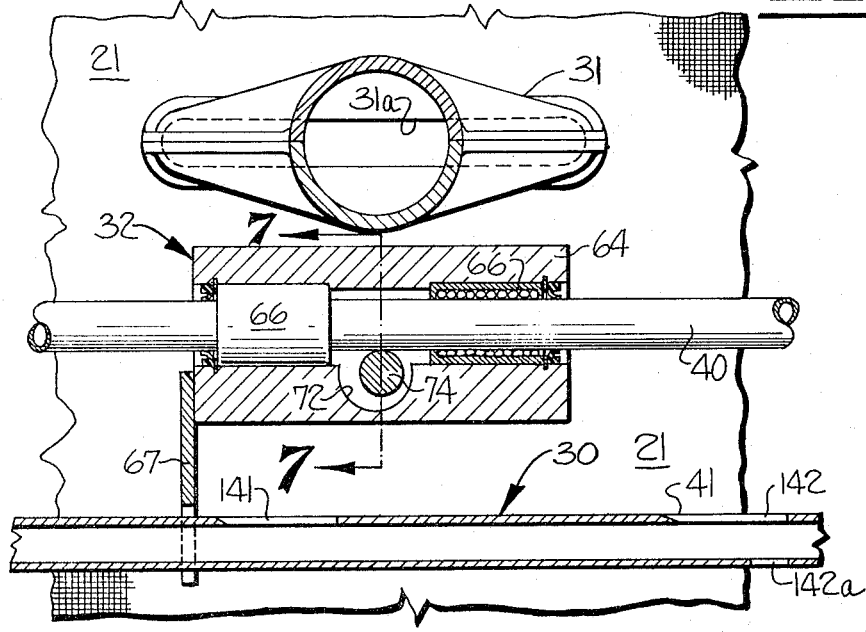

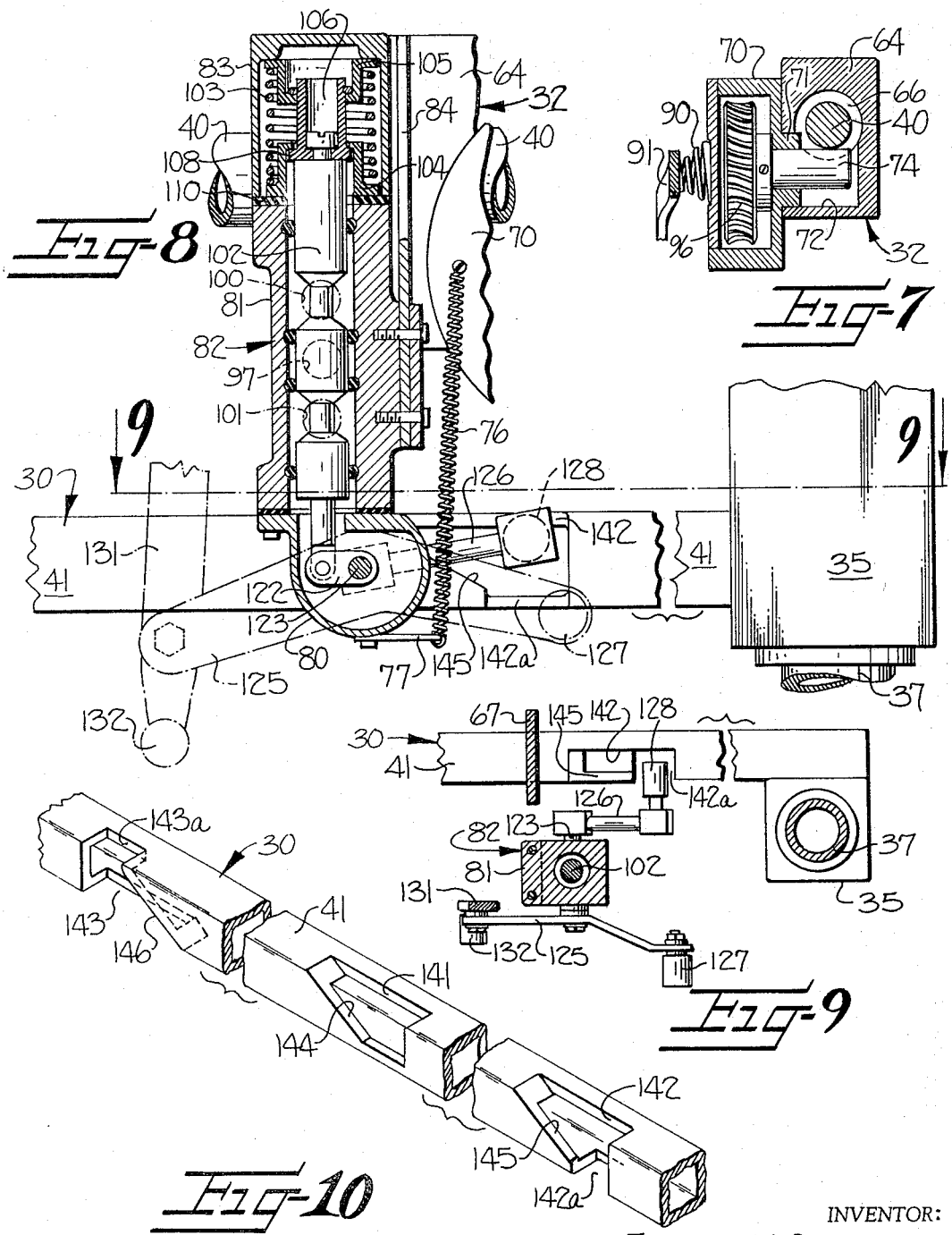

3,303,635
FILTER CLEANING SYSTEM
James W. Sherrill, Stanley, N.C., assignor to Microtron Corporation, Charlotte, N.C., a corporation of North Carolina
Filed Aug. 6, 1964, Ser. No. 387,898
22 Claims. (Cl. 55—96)

This invention relates to an improved method and apparatus utilizing suction for cleaning air filters and keeping them clean.

As is well known, the filters of air circulating systems, particularly such as are employed in textile mills and other industrial buildings or rooms, must be kept sufficiently clean to effect efficient filtration at all times. Various vacuum cleaning devices have been proposed heretofore for cleaning filters and, while some of the prior art devices have served quite well in many respects, they have had certain deficiencies in addition to being quite complicated and expensive to construct, install and maintain.

For example, there are known prior art vacuum cleaning devices provided with a suction nozzle which reciprocates from side to side of one face of an endless filter mounted on rolls which are operated to move the filter past the reciprocating nozzle. Another known cleaning apparatus, used with a stationary filter, has a carriage which reciprocates longitudinally of the filter and has a suction nozzle mounted thereon which is driven to move in a stepwise manner across the filter from one side ot the other and then to return in a stepwise manner back to said one side of the filter. There is a sufficient dwell following each stepwise movement to permit the carriage to traverse the length of the filter.

These exemplary filter cleaning systems are believed to be the most efficient available up to now. However, the relative speed between each suction nozzle and the filter being cleaned is necessarily slow to insure that dirt, lint and other foreign matter are removed effectively from the filter, and the path of the nozzle relative to the filter is substantially retraced when the nozzle reaches either side edge of the filter. Thus, the filter surface remote from the nozzle, as it starts back across the filter, becomes heavily laden with foreign matter by the time it is reached by the nozzle. This reduces the efficiency of the filter, notwithstanding the fact that the more heavily laden the filter is with foreign matter, the more difficult it is to clean the same.

It is herefore an object of this invention to provide an improved method and apparatus for cleaning filters in which a suction cleaning head is moved through a cleaning cycle adjacent and generally parallel to one face of a filter from a starting point through a sinuous path of travel to a terminal point and is then returned substantially to the starting point in a substantially straight or slightly curved path for quickly repositioning the suction head for starting a succeeding cleaning cycle.

Another object is to provide a filter cleaning unit of the character described comprising a carriage driven to reciprocate in one direction adjacent the filter with the suction head mounted thereon driven to move laterally of said one direction, and wherein the suction head is advanced laterally from a given starting point, such as adjacent one side edge of the filter, to a terminal point spaced therefrom, such as the opposite side edge of the filter, in a stepwise manner in timed relation to movement of the carriage so the suction head traces a sinuous path in each cleaning cycle, and wherein the suction head then is returned along said carriage to said starting point in a substantially uninterrupted and substantially straight movement during which the carriage does not move more than a complete stroke in said one direction.

Still another object is to provide a new and improved means for supporting and driving the suction head on the carriage.

Some of the objects of the invention having been stated, other objects will appear as the description proceeds, when taken in connection with the accompanying drawings, in which—

FIGURE 3 is an enlarged fragmentary elevation of the suction head, showing the carriage partially in section, and being taken substantially along line 3—3 in FIGURE 1;

FIGURE 4 is a view similar to FIGURE 3, but looking at the opposite side of the suction head and its carrier, and taken substantially along line 4—4 in FIGURE 1;

FIGURE 5 is an enlarged front elevation of the suction head, showing the same in a different position from that of FIGURE 1, with portions of the suction head carrier broken away;

FIGURE 6 is a fragmentary vertical sectional view taken substantially along line 6—6 in FIGURE 3 with the suction head and carrier occuping the same position as in FIGURE 5;

FIGURE 7 is a fragmentary vertical sectional view taken substantially along line 7—7 in FIGURE 6;

FIGURE 8 is a vertical sectional view taken substantially along line 8—8 in FIGURE 3 through the control valve for the fluid motor which drives the suction head carrier;

FIGURE 9 is a fragmentary sectional plan view, on a reduced scale, taken substantially along line 9—9 in FIGURE 8;

FIGURE 10 is a fragmentary perspective view of a portion of a traverse control cam bar which is a part of the main carriage and is instrumental in controlling operation of the suction head carrier.

Figure 1:
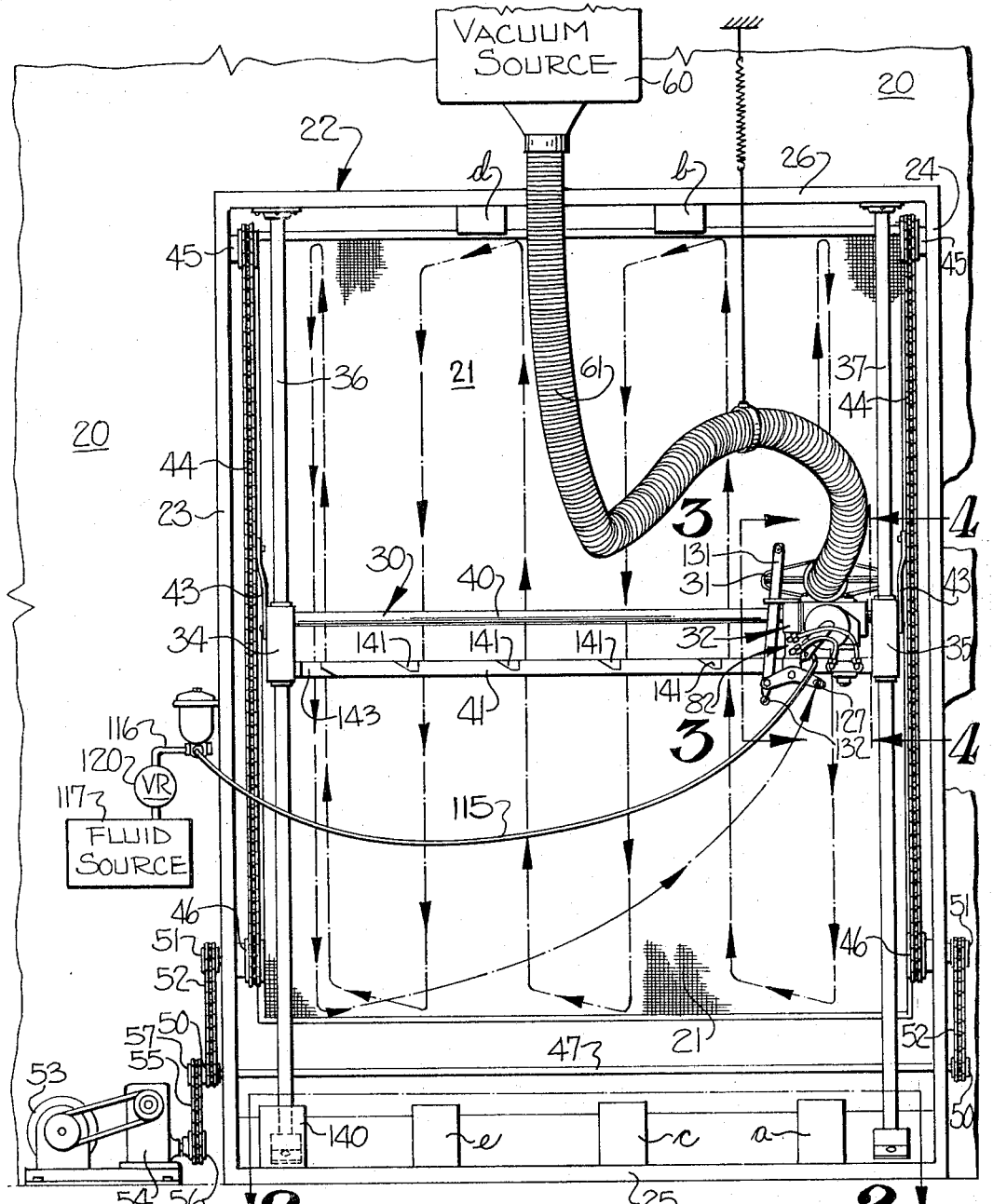
FIGURE 1 is a front elevation of a preferred embodiment of the present invention.

Referring more specifically to the drawings and, particularly, to FIGURE 1, the numeral 20 designates a building wall having an opening therethrough covered by a suitable filter 21. Filter 21 is shown as being substantially rectangular and mounted in fixed relation to a substantially rectangular frame 22 which may be formed of channel bars and includes spaced side members 23, 24 which may extend vertically and may be suitably secured to wall 20. Frame 22 also comprises lower and upper transverse frame members 25, 26. The filter cleaning apparatus of the present invention is mounted on frame 22.

The filter cleaning apparatus comprises a main carriage 30, a suction head or nozzle 31 and an auxiliary carriage or suction head carrier 32. For purposes of description only, main carriage 30 will be described herein as being vertically reciprocable or longitudinally reciprocable with respect to the front face of filter 21 while suction head 31 and its carrier 32 will be described as along carriage 30 and relative to the longitudinal axis of filter 21. However, it is to be distinctly understood that the apparatus may be used with a filter which is longer in the horizontal direction than it is in the vertical direction and, further, that filter 21 need not necessarily occupy a vertical position. In other words, the main carriage 30 is reciprocable in one direction and carrier 32 is movable in a transverse direction with respect to said one direction such as to cause the suction head 31 to trace a sinuous path embracing the front face of filter 21, as will be later described.

Main carriage 30 comprises a pair of laterally spaced end guide blocks or sleeves 34, 35 (FIGURES 1, 3, 4, 5, 8 and 9) which are guided for vertical movement on a pair of upright guide bars or posts 36, 37 spaced forwardly of and closely adjacent the front face of filter 21. Guide posts 36, 37 are also positioned adjacent opposed longitudinal side edges of filter 21 and upper and lower ends thereof are suitably secured to frame 22. Main carriage 30 also includes a transverse guide rod or track 40 and a transverse traverse control bar 41 whose opposed ends are suitably secured to sleeves 34, 35. Traverse control bar 41 is spaced beneath track 40 in this instance.

In order to transmit vertical reciprocatory movement to main carriage 30, the lower ends of a pair of links 43 (FIGURE 1) are pivotally connected to sleeves 34, 35 and the upper ends of links 43 are pivotally connected to corresponding runs of a pair of endless pliable elements or sprocket chains 44 mounted on respective pairs of upper and lower sprocket wheels 45, 46 journaled on frame members 23, 24. A drive shaft 47, journaled in the lower portions of side frame members 23, 24, is coupled to sprocket wheels 46 by corresponding pairs of sprocket wheels 50, 51 and sprocket chains 52. A motive means 53, in the form of an electric motor, is coupled to drive shaft 47 through the medium of a gear reduction unit 54, a sprocket chain 55 and a pair of sprocket wheels 56, 57.

It is apparent that motor 53 drives sprocket chains 44 and, as links 43 travel upwardly with chains 44, carriage 30 also travels upwardly. As the upper ends of links 43 travel around the upper sprocket wheels 45, they move downwardly thereby moving main carriage in a downward direction. The same is true when the upper ends of links 43 travel around lower sprocket wheels 46 to reverse downward movement of main carriage 30 so that it again moves upwardly.

Suction head 31 may be of a type having an elongate narrow nozzle opening 31a (FIGURES 5 and 6) positioned in close proximity to or against the front face of filter 21. A source of vacuum or suction 60 (FIGURE 1) may be connected to the suction nozzle by a flexible hose or conduit 61 and an intervening rigid tube 62 (FIGURES 3, 4 and 5).

Rigid tube 62 may be welded or otherwise suitably secured to a block 63 adjustably secured to a carrier guide block 64 as by screws 65. Carrier guide block 64 is a part of auxiliary carriage or carrier 32 and is guided for longitudinal movement along track 40 by means of a pair of anti-friction sleeve bushings 66, for example (FIGURE 6). In order to prevent guide block 64 from rotating on track 40, a yoke 67 (FIGURES 3, 4, 5, 6 and 8) is suitably secured to one end of block 64 and its bifurcated lower portion straddles and rides against opposed sides of traverse control bar 41.

An irregularly-shaped gear housing 70 (FIGURES 4, 5 and 7) is pivotally suspended from the front wall of carrier guide block 64 by means of a substantially circular hub 71 integral with and projecting rearwardly from the rear wall of gear housing 70 (FIGURE 7) and which fits in a substantially circular cavity 72 (FIGURE 6) formed in the lower front portion of carrier block 64. A carrier drive shaft 74 (FIGURES 5, 6 and 7) is rotatably mounted in the rear wall of gear housing 70 and penetrates hub 71 in eccentric relation thereto. Drive shaft 74 extends beneath and engages the lower surface of track 40.

The reason why drive shaft 74 is eccentrically positioned with respect to hub 71 is to provide means facilitating yieldable engagement of drive shaft 74 with the lower surface of track 40 by applying yieldable downward pressure to gear housing 70 at a point opposite from the axis of drive shaft 74 with respect to the axis of hub 71. To this end, the upper end of a tension spring 76 (FIGURES 4, 5 and 9) is pivotally connected to a portion of the front wall of gear housing 70 remote from the axis of drive shaft 74 with respect to the axis of hub 71, and the lower end of spring 76 is connected to a spring anchor 77 carried by a fixed part of carrier 32.

In this instance, spring anchor 77 is suitably secured to the bottom of a hollow valve lever casing suitably secured to the lower end of the tubular body 81 of a traverse controlling slide valve 82 which occupies a substantially vertical position as best shown in FIGURES 3, 5 and 8 and whose upper end is closed by a hollow cap 83 suitably secured to the upper end of valve housing 81. As shown in FIGURE 3, control valve 82 is positioned forwardly of track 40 and carrier guide block 64 and is suitably secured to an irregularly-shaped bracket 84 which extends rearwardly and is suitably secured to the front face of one end portion of guide block 64.

In order to maintain the rear wall of gear housing 70 in engagement with the front surface of carrier guide block 64 while permitting angular movement of hub 71 in cavity 72 (FIGURES 6 and 7), the outer surface of the front wall of gear housing 70 is engaged by one end of a compression spring 90 which is preferably positioned substantially in alinement with drive shaft 74. The front end of compression spring 90 engages a restraining arm 91 which extends downwardly and to the left in FIGURE 5, and is suitably secured to a lower forwardly extending portion of bracket 84.

The housing of a reversible fluid pressure motor 93 is suitably secured to and depends from the lower wall of gear housing 70 (FIGURE 5). The shaft 94 of motor 93 extends upwardly within housing 70 and has a worm or screw 95 fixed thereon which meshes with a worm gear 96 fixed on carrier drive shaft 74 (FIGURES 5 and 7).

Referring to FIGURE 8, it will be observed that valve housing 81 is provided with a fluid inlet 97 and a pair of fluid outlets 100, 101, the outlets being shown in phantom lines, since they are provided in the front wall portion of valve housing 81, which front wall portion is not shown in FIGURE 8. A valve core 102 is movable axially within housing 81 and is normally urged to occupy the neutral position shown in FIGURE 8 by means of a compression spring 103. Compression spring 103 seats against a pair of axially spaced spring seats 104, 105 whose central portions are slidably penetrated by a sleeve 106. The upper portion of sleeve 106 has a shoulder 108 thereon and is suitably secured to the upper end of valve core 102.

Upper spring seat 105 bears against the closed upper end of cap 83 and lower spring seat 104 bears against the upper end of housing 81 or a sealing washer 110 positioned between housing 81 and cap 83. Since slide valve constructions are generally well known, further details thereof will not be given herein. It is apparent that when valve core 102 occupies the neutral position shown in FIGURE 8, there is no communication between the inlet 97 and either of the outlets 100, 101. When valve core 102 is moved upwardly in FIGURE 8, communication is established between inlet 97 and lower outlet 101 and, conversely, when valve core 102 is moved downwardly, communication is established between inlet 97 and outlet 100.

Referring to FIGURE 5, in particular, it will be observed that corresponding ends of inlet conduits or pipes 112, 113 are connected to valve housing 81 for communication with the respective outlets 100, 101. The other ends of pipes 112, 113 are communicatively connected to opposite sides of fluid motor or air motor 93. Fluid motor 93 may be of a conventional type with conventional exhaust means. Pipes 112, 113 are preferably of flexible material so that motor 93 and gear housing 70 are enabled to move angularly with respect to carrier guide block 64, thereby permitting spring 76 to yieldably maintain carrier drive shaft 74 against track 40.

A flexible fluid pressure inlet conduit or hose 115 (FIGURES 1, 3, 4 and 5) is connected to the rear portion of valve housing 81 for communication with inlet 97 (FIGURE 8). Hose 115 extends to and communicates with a rigid pipe 116 suitably secured to side frame member 23 (FIGURE 1) and leading from a suitable source of fluid pressure, such as compressed air, shown schematically at 117. A suitable regulator valve 120 may be interposed in pipe 116 for controlling the speed of motor 93.

It will be observed in FIGURE 8 that the reduced lower end of valve core 102 loosely extends into valve lever housing 80 and is pivotally connected to a crank arm 122 suitably secured to a pivot shaft 123 oscillatably mounted in the front and rear walls of valve lever housing 80. The front end of pivot shaft 123 has a medial portion of a valve lever 125 fixed thereon. The rear end of pivot shaft 123 has one end of a follower arm 126 fixed thereon (FIGURE 3). Corresponding end portions of valve lever 123 and follower arm 126 have respective cam followers 127, 128 thereon, and the other end of valve lever 125 is pivotally connected to a lower portion of a substantially vertically disposed actuator link 131 having lower and upper cam followers 132, 133 mounted on respective upper and lower end portions thereof (FIGURES 3, 4, 5, 8 and 9).

A medial portion of actuator link 131 is guided for substantially vertical sliding movement in a guide plate 135 suitably secured to and extending outwardly from the upper end of valve cap 83 (FIGURE 5). It should be noted that, although follower 132 is disposed adjacent the lower portion of carrier 32, the upper follower 133 is positioned above the level of carrier 32 and adjacent suction head 31.

Referring to FIGURE 1, it will be observed that a plurality of suction head stepping or advancing cams are provided for initiating each of a plurality of steps in advancement of suction head 31 and carrier 32 along carriage 30 from a given starting point to a given terminal point relative to the filter 21 and in timed relation to vertical reciprocation of carriage 30. The number and frequency or spacing of such suction head shifting cams is, of course, dependent upon the length of the nozzle opening 31a in suction head 31 and the extent of the lateral dimension of the filter 21. In this instance, and by way of example only, three laterally spaced lower or primary, stationary, suction-head-shifting cams a, c, e are provided in substantially horizontal alinement with each other and are shown in the form of substantially rectangular plates suitably secured to bottom frame member 25 of frame 22.

Two upper laterally spaced suction-head-shifting cams b, d are also provided, which are staggered with respect to the lower cams a, c, e. Cams b, d also are in the form of substantially rectangular plates suitably secured to upper frame member 26 of frame 22. Lower cams a, c, e are adapted to be engaged by cam follower 127 for moving valve lever 125 in a counterclockwise direction in FIGURES 5 and 8 as the suction head 31 and carriages 30, 32 approach the lower end of each corresponding downward stroke thereof. The upper cams b, d are arranged to be engaged by upper follower 133 (FIGURES 3 and 4) as suction head 31 approaches the upper end of each corresponding upward stroke, with the exception of the terminal strokes of carriage 30 and suction head 31 effected with completion of a filter cleaning cycle.

Figure 2:
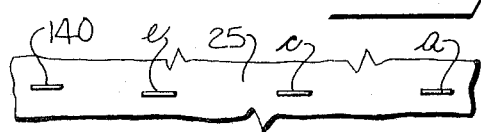
FIGURE 2 is a somewhat schematic plan view taken substantially along line 2—2 in FIGURE 1.

In other words, there are no cams corresponding to either the cams a, c, e or the cams b, d adjacent the terminal or left-hand side edge of filter 21 in FIGURE 1. Instead, a suction-head-returning cam 140 is suitably secured to lower frame member 25 of frame 22 adjacent the vertical plane of the left-hand side edge of filter 21 in FIGURE 1. Although the upper surface of cam 140 may be positioned on substantially the same level as the upper surfaces of cams a, c, e, it is positioned rearwardly of cams a, c, e, as shown in FIGURE 2, so as to engage follower 132 on the lower end of actuator link 131. It will be noted that follower 132 is positioned rearwardly of the lateral plane of follower 127 so that, in effect, whenever follower 127 engages any one of the cams a, c, e, follower 132 is positioned rearwardly of and out of the vertical plane of cams a, c, e and, conversely, whenever follower 132 engages cam 140, follower 127 is positioned forwardly of and thus does not engage cam 140.

Referring now to FIGURES 1, 5, 6, 8, 9 and 10, it will be observed that the medial portion of traverse control bar 41 has a plurality of longitudinally spaced notches 141 in the upper front portion thereof, which notches are open at the top only and are arranged to correspond substantially to the paths traced by suction head 31 and carrier 32 during vertical reciprocation of carriage 30 between those vertical movements thereof which occur when nozzle 31 moves adjacent the opposed side edges of filter 21; i.e., when the nozzle 31 moves in the vertical starting strokes and terminal strokes of each filter cleaning cycle. Unlike the intervening notches 141 in traverse control bar 41, opposed end portions of traverse control bar 41 are provided in their front faces with notches 142, 143 which are open to the respective upper and lower surfaces of bar 41 and communicate with respective slots 142a, 143a (FIGURE 10) in respective lower and upper surfaces of bar 41.

The bottom of each notch 141 is defined by an upper inclined cam surface 144 which slopes upwardly and in the direction of advancement of carrier 32 along carriage 30. An upper inclined cam surface 145 defines the bottom of notch 142 and extends upwardly from slot 142a in the manner of cam surfaces 144.

The upper wall of notch 143 is a lower inclined or sloping bottom cam surface 146 (FIGURE 10) which slopes from adjacent the upper surface of traverse control bar 41 at slot 143a to the lower surface of bar 41. Thus, each of the upper inclined cam surfaces 144, 145 slopes upwardly and to the left in FIGURES 1, 5, 8 and 10, and the lower inclined cam surface 146 slopes downwardly and to the right in FIGURES 1 and 10. The purpose of the cam surfaces 144, 146 will be presently described.

*Method of operation*

For purposes of description, it may be assumed that suction head 31 and carrier 32 occupy a starting point in FIGURE 1 preparatory to initiating a filter cleaning cycle during which the suction head travels in a sinuous path from right to left in FIGURE 1. It shall also be assumed that motor 53 is started, fluid pressure is being introduced to the inlet 97 (FIGURE 8) of control valve 82, and valve core 102 occupies the neutral position shown in FIGURE 8. This being the case, air motor or fluid motor 93 will not be operating.

At the start of a filter cleaning cycle, carriage 30 is moved upwardly in the manner heretofore described to move suction head 31 in an upward stroke to a point adjacent the upper edge of filter 21. There being no cam like cams b, d above carrier 32, the suction head 31 moves downwardly with carriage 30, without being advanced laterally, until follower 127 engages cam a. Further downward movement of carrier 32 relative to cam a is such that the movable control means comprising valve lever 125, crank 122 and follower arm 126 are moved sufficiently in a counterclockwise direction in FIGURE 8 to lower valve core 102 and establish communication between inlet 97 and outlet 100, thereby actuating fluid motor 93 to advance carrier 32 and suction head 31 from right to left in FIGURES 1, 8 and 9.

Cam a (FIGURE 1) is of sufficient length to insure that follower 128 (FIGURE 8) moves substantially into engagement with inclined cam surface 145 of control bar 41 before follower 127 moves out of engagement with cam a thereby insuring that valve core 102 remains in its lower opened position. Also, the speed of lateral travel of carrier 32 is such that follower 128 will move substantially into engagement with cam surface 145 before the carriage 30 has commenced upward in a succeeding upward stroke to such extent as to move follower 127 (FIGURE 8) away from cam *a*. Thus, with continued advancing movement of carrier 32 from right to left in FIGURES 1 and 8, follower 128 rides against inclined cam surface 145 and is led into engagement with the upper surface of traverse control bar 41. This maintains actuation of motor 93 until follower 128 moves into registration with the next succeeding notch 141, as shown in FIGURE 8, and permits valve core 102 to return to the neutral position shown in FIGURE 8, thereby stopping motor 93 and arresting lateral movement of suction head 31.

The distance between the right-hand walls of the adjacent notches 142, 141 and between the right-hand walls of slot 143*a* and the last preceding notch 141 may be substantially equal to the length of the opening 31*a* in nozzle 31, and preferably is less than the length of the opening in nozzle 31, so that nozzle opening 31*a* will trace a path overlapping the path previously traveled thereby during successive vertical strokes of carriage 30.

As suction head 31 approaches the upper end of its corresponding or second upward stroke with carriage 30, follower 133, on the upper portion of actuator link 131, engages cam *b* (FIGURE 1) to again move valve lever 125 in a counterclockwise direction in FIGURES 5 and 8 to initiate a succeeding lateral advancement of suction head 31 and carrier 32 in substantially the same manner as that which was effected when follower 127 engaged cam *a* (FIGURE 1).

It is apparent that, as the carriage approaches the ends of the next three succeeding vertical strokes thereof, the cams *c*, *d*, *e* cause the suction head to advance from right to left, in a stepwise manner (FIGURE 1), in substantially the same manner as that described with respect to the cams *a*, *b*. It can be seen therefore that suction head 31 is moved in a sinuous path from a starting point to a terminal point in each filter cleaning cycle.

Since the last of the carrier advancing cams *e* is positioned to effect an advancing step in movement of carrier 32 at the end of a downward stroke and at the commencement of an upward stroke of carriage 30, and there is no cam corresponding to cams *b* and *d* for engagement by follower 133 as carrier 32 reaches the upper end of its terminal upward stroke, suction head 31 traces substantially the same path during the course of its succeeding terminal downward stroke as it did during its terminal upward stroke. During the terminal upward and downward strokes of suction head 31, it is apparent that follower 128 is positioned in the vertical planes of notch 143 and slot 143*a* and between the planes of the upper and lower surfaces of traverse control bar 41.

Therefore, as carriage 30 reaches the lower end of its terminal vertical stroke in each filter cleaning cycle, follower 132 engages suction head returning cam 140 (FIGURE 1), thereby moving valve lever 125, follower arm 126 and crank arm 122 (FIGURE 8) in a clockwise direction to raise valve core 102 sufficiently to establish communication between fluid inlet 97 and outlet 101. This actuates motor 93 so that its shaft and worm 95 rotate in a reverse direction; i.e., in the opposite direction from that in which they rotate during advancement of carrier 32 from right to left in FIGURE 1.

Thus, follower 128 engages lower cam surface 146 (FIGURE 10) so that cam surface 146 leads follower 127 into engagement with the lower surface of traverse control bar 41 as carriage 30 commences its next succeeding upward stroke. Carrier 32 is propelled from left to right (FIGURE 1) along carriage 30 at such speed relative to the speed of vertical movement of carriage 30 that, well before carriage 30 has reached the upper end of the corresponding upward stroke thereof, carrier 32 will have returned to its initial starting point or, at least, to the vertical plane at which an initial vertical stroke of a cycle is effected.

As carrier 32 reaches the starting position adjacent the right-hand end of carriage 30 in FIGURES 1 and 8, follower 128 moves into registration with and passes through slot 142*a* as spring 103 (FIGURE 8) returns valve core 102 to the neutral position and stops motor 93. It is apparent that, depending upon the relative speeds of carriage 30 and carrier 32, the suction cleaning head is returned from the terminal point substantially to said starting point in a substantially straight path of travel. Although the path of travel of suction head 31 may be curved to some extent during its return from the terminal point to substantially the starting point, it may be considered as moving in a substantially straight uninterrupted path, particularly in view of the sinuosity of the path traced by the suction head 31 during the cleaning cycle; i.e., during vertical reciprocation of carriage 30 and stepwise advancement of suction head 31 from right to left along carriage 30.

In the event that a different size suction nozzle is used or it is desirable to change the extent at which successive cleaned portions of the filter are overlapped by the suction nozzle, cam bar 41 may be replaced by a similar cam bar whose notches 141, 142, 143 may be spaced further apart or closer together, as desired, with corresponding changes being made in shifting cams *a*–*e*.

From the foregoing description, it is apparent that the carrier 32 is advanced a plurality of steps of predetermined length in one direction along carriage 30 in response to certain successive movements of carriage 30 to positions adjacent the ends of the strokes of the carriage, and that a return movement then is imparted to carrier 32 in the opposite direction for a distance substantially equal to the combined length of the steps of advancement thereof in response to a terminal stroke of the carriage and before completion of another immediately succeeding stroke or reciprocation of the carriage so that, at the beginning of each filter cleaning cycle, nozzle 31 starts to clean that portion of the filter which has had the most time to collect foreign matter thereon.

In the drawings and specification there has been set forth a preferred embodiment of the invention and, although specific terms are employed, they are used in a generic and descriptive sense only, and not for purposes of limitation, the scope of the invention being defined in the claims.

I claim:
1. A method of cleaning a filter which comprises
   (a) moving a suction cleaning head automatically through a filter cleaning cycle adjacent and generally parallel to one face of the filter from a starting point through a sinuous path of travel to a terminal point while applying a suction cleaning force to the filter through said suction cleaning head and while simultaneously cleaning gas with said filter, and
   (b) automatically returning said suction cleaning head from said terminal point and across the filter substantially to said starting point in a substantially direct path of travel crossing said sinuous path of travel previously traced during said filter cleaning cycle while continuing application of said suction cleaning force to effect additional cleaning of the filter and for quickly repositioning said suction cleaning head for a succeeding filter cleaning cycle.
2. A method of cleaning a filter comprising
   (a) reciprocating a suction cleaning head automatically through a filter cleaning cycle adjacent and generally parallel to one face of the filter from a starting point adjacent and substantially parallel to one side edge of the filter to positions adjacent opposite end edges of the filter, while applying a suction cleaning force to the filter through said cleaning head and while simultaneously cleaning gas with said filter, while
   (b) shifting the cleaning head laterally in one lateral direction a distance no greater than the lateral dimension of the cleaning head at the end of strokes of the cleaning head incident to reciprocation thereof until said cleaning head reaches a terminal position adjacent the opposite side edge of the filter, then (c) automatically returning the cleaning head from said terminal position across the filter and across the path of travel previously traced by the suction cleaning head during said filter cleaning cycle and substantially to said starting point during a single stroke of the cleaning head between said opposite end edges of the filter, and (d) repeating of the steps substantially as prescribed.

3. A method of cleaning a filter which comprises (a) automatically repeatedly effecting relative longitudinal movement between the filter and a suction cleaning head closely adjacent the same substantially parallel to one face of the filter and in strokes of a length corresponding substantially with the full length of the filter, while applying a suction cleaning force to the filter through the cleaning head, while (b) moving the cleaning head transversely of the filter in a plurality of stepwise movements from a starting point adjacent one side edge of the filter to a terminal point adjacent the opposite side edge of the filter and wherein each transverse stepwise movement of the cleaning head occurs substantially at the end of each of certain strokes in relative longitudinal movement between the filter and the cleaning head, and (c) automatically returning the suction cleaning head transversely from said terminal point across the filter and across the path previously traced by the suction cleaning head during said strokes in relative longitudinal movement and substantially to said starting point within an interval of time less than the interval of time required for completion of one of said strokes in relative longitudinal movement between the suction cleaning head and the filter and while continuing application of said suction cleaning force to effect additional cleaning of the filter during said interval and while simultaneously cleaning gas with said filter.

4. A method of cleaning a substantially rectangular filter which comprises (a) automatically reciprocating a suction cleaning head longitudinally of and substantially parallel to and closely adjacent one face of the filter and in strokes of a length corresponding substantially with the full length of the filter, while applying a suction cleaning force to the filter through the cleaning head, while (b) moving the cleaning head transversely of the filter in a plurality of stepwise movements from adjacent one side edge of the filter to a terminal point adjacent the opposite side edge of the filter and wherein each transverse stepwise movement of the cleaning head corresponds substantially with each of a plurality of successive strokes in longitudinal movement of the cleaning head, and (c) automatically returning the suction cleaning head from said terminal point across the filter and across the path previously traced by the suction cleaning head during said strokes thereof longitudinally of the filter and to a point adjacent said one side edge within an interval of time less than the interval of time required for completion of one of said strokes of the cleaning head longitudinally of the filter and while continuing application of said suction cleaning force to effect additional cleaning of the filter during said interval while simultaneously cleaning gas with said filter.

5. Apparatus for cleaning a filter comprising (a) a suction cleaning head connected to a source of suction, (b) means for moving said suction cleaning head through a filter cleaning cycle adjacent and generally parallel to one face of the filter from a starting point through a sinuous path of travel to a terminal point, (c) said cleaning head being positioned in close proximity to said face of the filter so as to apply a suction cleaning force to the filter through said suction cleaning head, and (d) said means for moving said head being operable to return said suction cleaning head from said terminal point across the filter substantially to said starting point in a substantially direct path of travel in which said cleaning head crosses said sinuous path of travel previously traved thereby during said filter cleaning cycle for quickly repositioning said suction head for a succeeding filter cleaning cycle.

6. Apparatus for cleaning a filter comprising (a) a suction cleaning head, (b) an elongate carriage supporting said head adjacent one face of said filter for reciprocatory movement in one direction longitudinally of and relative to said carriage and generally parallel to said filter, (c) means supporting said carriage for reciprocatory movement in another direction substantially perpendicular to said one direction, (d) means operatively connected to and reciprocating said carriage in said perpendicular direction of said filter, (e) drive means operatively associated with said suction cleaning head for moving the same along said carriage in said one direction, (f) control means operatively associated with said drive means to move said suction head a predetermined distance along said carriage from a predetermined starting point to a predetermined terminal point in a stepwise manner and in timed relation to reciprocating movement of said carriage in said perpendicular direction, and (g) said control means being operable to return said suction head from said terminal point substantially to said starting point during a single stroke incident to reciprocation of said carriage in said perpendicular direction.

7. Apparatus for cleaning a filter comprising (a) a suction cleaning head, (b) means for moving said suction cleaning head through a cleaning cycle adjacent and generally parallel to one face of the filter from a starting point through a sinuous path of travel to a terminal point, and including (1) an elongated carriage, (2) means for reciprocating said carriage transversely thereof, (3) a carrier supporting said head and mounted for movement longitudinally of said carriage, (4) means for imparting predetermined movement to said carrier in one direction along said carriage at the end of certain strokes of said carriage incident to reciprocation of said carriage, and (c) said last-named means being operable to return said suction cleaning head along said carriage from said terminal point substantially to said starting point within an interval of time no greater than that required for completion of a corresponding stroke of said carriage for quickly repositioning said suction head for a succeeding cleaning cycle.

8. Apparatus for cleaning the face of an air filter comprising (a) an elongate carriage extending generally parallel to and adjacent one face of the filter;

(b) means for repeatedly effecting relative movement between said carriage and said filter in a direction transversely of said elongate carriage and in strokes of a length corresponding substantially with the full length of said filter, (c) a carrier mounted for movement longitudinally of said carriage and having a suction nozzle thereon connected to a source of suction for applying a suction cleaning force through said nozzle to the filter, (d) said carrier including a normally inactive motor means operatively connected to said carriage for moving said carrier longitudinally of said carriage, (e) means responsive to each of certain of said strokes in relative movement between said filter and said carriage for actuating said motor means to move said carrier and suction nozzle a predetermined distance in one direction longitudinally of said carriage, and (f) means on said carriage for rendering inactive said motor means upon predetermined movement of said carrier and suction nozzle following each actuation of said motor means by said responsive means.

9. Apparatus according to claim 8, including reversing means operatively associated with said motor means to effect movement of said carrier and nozzle in an opposite direction from said one direction longitudinally of said carriage, means responsive to a stroke in relative movement between said carriage and said filter following a predetermined number of movements of said carrier in said one direction for actuating said reversing means, said reversing means being operable to cause said carrier to move in said opposite direction a distance along said carriage greater than the equivalent of a plurality of said predetermined movements of said carrier in said one direction prior to completion of another immediately succeeding stroke in relative movement between said carriage and said filter, and additional means on said carriage for rendering inactive said motor means upon completion of the latter movement of said carrier.

10. Apparatus for cleaning one face of an air filter comprising (a) an elongate carriage supported for reciprocatory movement transversely thereof, generally parallel to, and adjacent one face of the filter, (b) a carrier mounted for movement longitudinally of said carriage from a predetermined starting point and having a suction nozzle thereon connected to a source of suction for applying a suction cleaning force to said one face of the filter, (c) means for imparting said reciprocatory movement to said carriage, (d) means responsive to certain successive movements of said carriage to a position adjacent at least one end of each corresponding stroke thereof for imparting a step in movement to said carrier a predetermined distance in one direction longitudinally of and relative to said carriage, and (e) means responsive to movement of said carriage to the end of a terminal stroke thereof following a plurality of said steps in movement of said carrier for imparting a return movement to said carrier in the opposite direction relative to said carriage for a distance substantially equal to the combined steps thereof and before a succeeding stroke of said carriage is completed.

11. A structure according to claim 10, wherein said means defined in (d) and (e) comprises (1) a normally inactive reversible motor operatively connected to said carrier, (2) follower means on said carrier operatively connected to said motor for controlling operation thereof and normally occupying an inactive position, (3) a carrier advancing cam engageable by said follower means for moving the same in one direction to an active position relative to said carrier for operating said motor to move said carrier in said one direction as said carriage moves to a position adjacent at least one end of each stroke thereof in said certain successive movements thereof, and (4) a carrier returning cam engageable by said follower means for moving the same to another active position relative to said carrier for operating said motor to move said carriage in said opposite direction upon movement of said carriage to the end of said terminal stroke thereof.

12. A structure according to claim 11, including means operable independently of said cams for maintaining said follower means in the corresponding active positions to which it is moved by said cams for a predetermined interval corresponding to the distance the carrier is to move in each instance.

13. Apparatus for cleaning one face of an air filter comprising (a) an elongate carriage supported for reciprocatory movement in one plane of, generally parallel to, and adjacent one face of the filter, (b) a carrier mounted for movement longitudinally of said carriage from a predetermined starting point and having a suction nozzle thereon, (c) means for imparting said reciprocatory movement to said carriage, (d) a normally inactive reversible motor connected to said carriage for moving said carrier longitudinally of said carriage, (e) a movable control means normally occupying an inactive position and being operatively connected to said motor for controlling operation thereof, (f) means responsive to each of a plurality of successive strokes of said carriage to positions adjacent opposite ends of said filter for moving said movable control means to a first predetermined active position for activating said motor for a predetermined interval to move said carrier a predetermined distance in one direction, and (g) means responsive to a stroke of said carriage following said successive strokes for moving said control means to a second active position for reversely activating said motor for a predetermined interval such as to move said carrier in the opposite direction a distance substantially equal to the combined extent of the aforesaid predetermined distances prior to completion of another immediately succeeding reciprocation of said carriage.

14. A structure according to claim 13, wherein said carriage includes an elongate guide bar and said carrier includes a block penetrated by and guide for longitudinal movement on said guide bar; a housing supporting said motor and being pivotally mounted on said block for angular movement about an axis substantially perpendicular to the axis of said guide bar, a shaft driven by said motor, projecting from said housing and engaging said bar, said shaft being eccentrically positioned with respect to the axis on which said housing is pivotally mounted, and means yieldably urging said housing in an angular direction such as to yieldably maintain said shaft against said guide bar.

15. A structure according to claim 13, wherein said motor is a fluid operated motor, said movable control means comprising a valve movable from a neutral position to a first open position for introducing fluid into one side of said motor to drive said carrier in said one direction, and said valve also being movable from said neutral position to a second open position for introducing fluid into another side of said motor to drive said carrier in the opposite direction.

16. Apparatus for cleaning a substantially rectangular filter comprising (a) a suction cleaning head, (b) a carriage supporting said head adjacent one face of said filter for movement transversely of and generally parallel to said filter, (c) means supporting said carriage for movement longitudinally of said filter, (d) means operatively connected to and reciprocating said carriage longitudinally of said filter, (e) drive means operatively associated with said suction cleaning head for moving the same along said carriage transversely of said filter, (f) control means operatively associated with said drive means to move said suction head a predetermined distance along said carriage from a predetermined starting point to a predetermined terminal point in a stepwise manner and in timed relation to longitudinal reciprocating movement of said carriage, and (g) said control means being operable to return said suction head from said terminal point substantially to said starting point in a substantially straight and uninterrupted line of movement.

17. Apparatus for cleaning one face of an air filter comprising (a) an elongate carriage supported for reciprocatory movement in one plane of, generally parallel to, and adjacent one face of the filter, (b) a carrier mounted for movement longitudinally of said carriage from a predetermined starting point and having a suction nozzle thereon, (c) means for imparting said reciprocatory movement to said carriage, (d) a fluid motor on said carrier for imparting movement thereto longitudinally of said carriage, (e) a valve normally occupying and biased to a neutral position and movable to a first position for introducing fluid into one side of said motor to move said carrier in one direction, said valve being movable to a second position for introducing fluid into another side of said motor to move said carrier in the opposite direction, (f) a follower movable with said valve, (g) a traverse control bar extending longitudinally of said carriage and having a plurality of longitudinally spaced notches in one side thereof for successively receiving said follower therein, said bar also having a pair of slots therethrough spaced from and straddling said plurality of notches, said follower occupying a neutral position when in any one of said notches or said slots, (h) means responsive to movement of said carriage at the ends of certain successive strokes thereof for moving said follower in one direction and to position the same so its rides in engagement with one side of said control bar and maintains said valve in said first position until the follower registers with and enters a succeeding one of said notches or the succeeding slot, said follower being positioned in said last-named slot when said carriage moves in a terminal stroke following said successive strokes, and (i) means responsive to movement of said carriage in said terminal stroke for moving said follower in the opposite direction out of said last-named slot and to position the same so it rides in engagement with the opposite side of said bar and maintains said valve in said second position until the follower registers with and enters the other of said slots.

18. Apparatus for cleaning one face of a filter comprising (a) an elongate carriage, (b) means mounting said carriage for reciprocatory movement along a path of travel extending generally normal to the length thereof, (c) means for imparting said reciprocatory movement to said carriage, (d) a carrier mounted upon and selectively movable in both forward and reverse directions longitudinally of said elongate carriage, said carrier including (1) a suction head,
 (2) a reversible air motor,
 (3) reversing valve means interconnecting said air motor and a source of compressed air and movable to first and second operating positions for controlling the supply of air to said air motor and to a third operating position for interrupting the supply of air to said air motor,
 (4) drive means interconnecting said air motor and said carriage for causing said motor to move said carrier in a forward direction when said valve means is disposed in said first operating position and in a rearward direction when said valve means is disposed in said second operating position, and
 (5) cam-actuated control means connected to said reversing valve means for moving the same to said operating positions thereof, (e) first cam means mounted adjacent opposite ends of the path of reciprocatory movement of said carriage, (f) second cam means located subsequent to said first cam means and adjacent one end of the path of reciprocatory movement of said carriage, (g) said first cam means engaging said cam-actuated control means in the course of movement of said carriage along said path of travel for moving said valve means to said first position and causing successive movements of said carrier and said suction head thereof longitudinally of said carriage in one direction, (h) said second cam means engaging said cam-actuated control means in a movement of said carriage subsequent to said first cam means to move said valve means to said second position and causing movement of said carrier and said suction head in the opposite direction, and (i) an elongate cam bar on said carriage having means for maintaining said valve means in said first position for relatively short distances of movement of said carrier in one direction and for maintaining said valve means in said second position for a long distance of movement of said carrier in the opposite direction substantially equal to the combined length of said short distances.

19. Apparatus for cleaning one face of an air filter comprising (a) an elongate carriage supported for reciprocatory movement in one plane of, generally parallel to, and adjacent one face of the filter, (b) a carrier mounted for movement longitudinally of said carriage and having a suction nozzle thereon, (c) means for imparting said reciprocatory movement to said carriage, (d) a normally inactive motor carried by said carrier and operatively connected to said carriage for moving said carrier longitudinally of said carriage, (e) means responsive to certain strokes of said carriage during reciprocation thereof for actuating said motor to move said carrier, and (f) means on said carriage for rendering inactive said motor upon predetermined movement of said carrier following each actuation of said motor by said responsive means.

20. Apparatus for cleaning one face of an air filter comprising (a) an elongate carriage supported for reciprocatory movement in one plane of, generally parallel to, and adjacent one face of the filter, (b) a carrier mounted for movement longitudinally of said carriage and having a suction nozzle thereon, (c) means for imparting said reciprocatory movement to said carriage, (d) a normally inactive motor carried by said carrier and operatively connected to said carriage for moving said carrier longitudinally of said carriage, (e) normally inactive motor actuating means on said carrier for controlling said motor, (f) means engageable by said actuating means at the end of certain strokes of said carriage during reciprocation thereof for actuating said motor to impart movement to said carrier longitudinally of said carriage, and (g) means on said carriage for rendering inactive said motor upon predetermined movement of said carrier following each actuation of said motor by said engageable means.

21. Apparatus for cleaning one face of an air filter comprising (a) an elongate carriage supported for reciprocatory movement in one plane of, generally parallel to, and adjacent one face of the filter, (b) a carrier mounted for movement longitudinally of said carriage from a predetermined starting point and having a suction nozzle thereon, (c) means for imparting said reciprocatory movement to said carriage, (d) a normally inactive motor carried by said carrier and operatively connected to said carriage for moving said carrier longitudinally of said carriage, (e) motor actuating means on said carrier for controlling said motor and being biased normally to an inactive position, (f) cam means engageable by said actuating means at the end of certain strokes of said carriage during reciprocation thereof for moving said actuating means to an active position thereby actuating said motor and imparting movement to said carrier longitudinally of said carriage, (g) an elongate traverse control means on said carriage and having a first longitudinal control surface thereon, (h) said actuating means including an element movable into engagement with said control surface of said traverse control means for maintaining actuation of said motor whenever said actuating means moves out of engagement with said engageable means, and (i) said control surface having a plurality of spaced openings therein into which said element moves upon predetermined movement of said carrier following each actuation of said motor to inactivate said motor.

22. A structure according to claim 21, in which said motor is reversible, additional cam means engageable by said actuating means at the end of a terminal stroke of said carriage following said certain strokes during reciprocation thereof and being operable to move said element in the opposite direction from that in which it is moved by engagement of said actuating means with said first-named cam means to so actuate said motor as to impart reverse movement to said carrier longitudinally of said carriage, said control member having a second longitudinal control surface thereon opposite from said first surface, said additional cam means being operable also to move said element into engagement with said second surface of said traverse control member, and said second surface also having at least one opening therein for receiving said element upon predetermined movement of said carrier in the reverse direction to render said motor inactive.

References Cited by the Examiner

UNITED STATES PATENTS

| | | | |
|---|---|---|---|
| 1,630,972 | 5/1927 | Schmid | 15—312 |
| 1,919,132 | 7/1933 | Riley | 15—312 |
| 2,063,874 | 12/1936 | Hodge | 15—312 |
| 2,516,680 | 7/1950 | Culpepper | 55—290 |
| 2,601,704 | 7/1952 | Streun | 55—294 |
| 3,188,680 | 6/1965 | Black | 55—272 X |

REUBEN FRIEDMAN, *Primary Examiner.*

J. ADEE, *Assistant Examiner.*